Feb. 22, 1938.  H. J. DIETRICH  2,109,061
WOODWORKING MACHINE
Filed Oct. 2, 1935  3 Sheets-Sheet 1

Inventor
H. J. Dietrich
by Hazard and Miller
Attorneys.

Feb. 22, 1938.  H. J. DIETRICH  2,109,061
WOODWORKING MACHINE
Filed Oct. 2, 1935  3 Sheets-Sheet 2

Inventor
H. J. Dietrich
by Hazard and Miller
Attorneys.

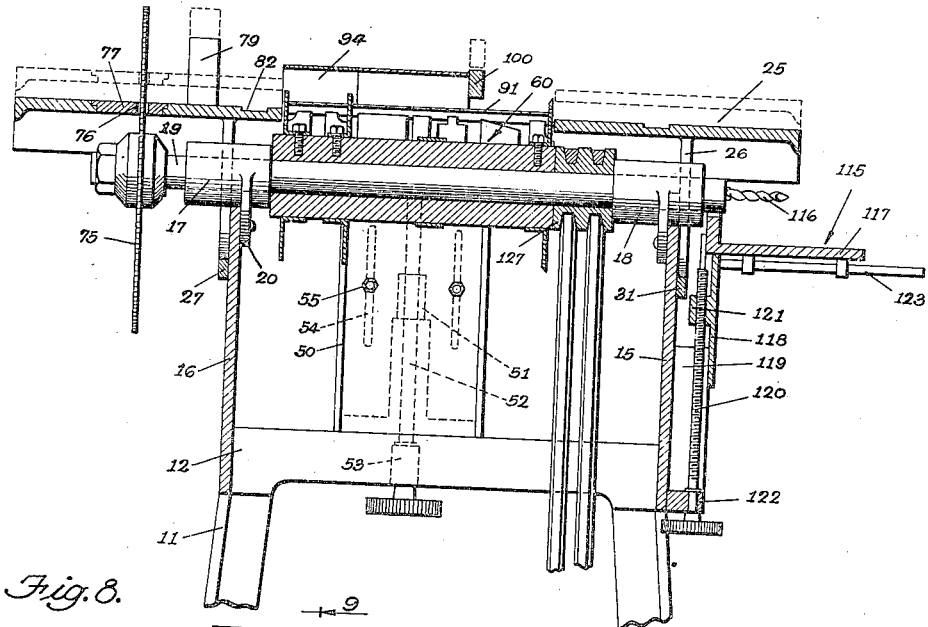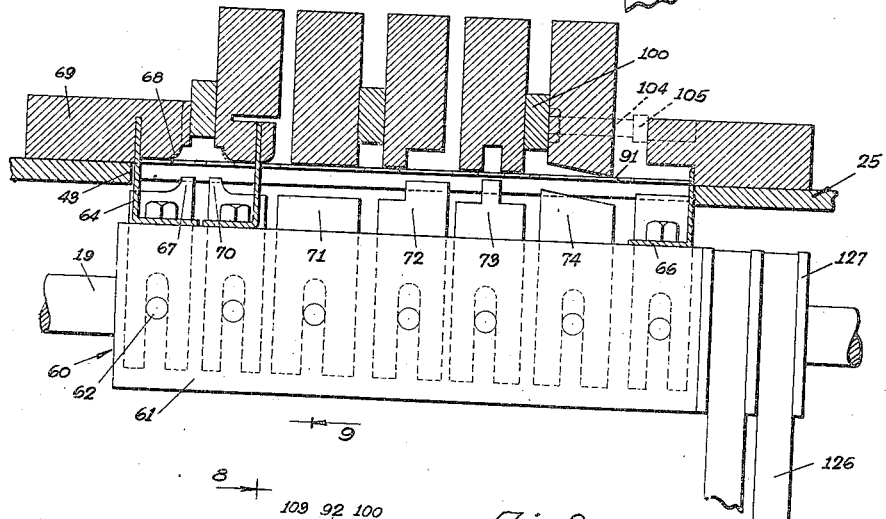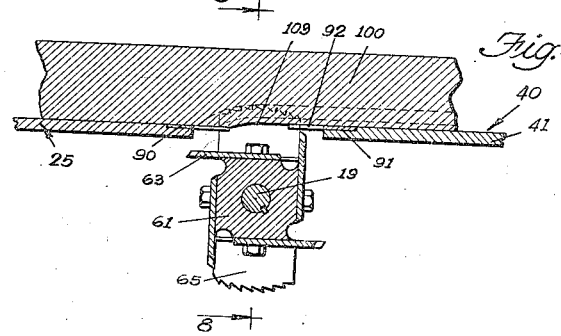

Patented Feb. 22, 1938

2,109,061

UNITED STATES PATENT OFFICE 2,109,061

WOODWORKING MACHINE

Henry J. Dietrich, Banning, Calif.

Application October 2, 1935, Serial No. 43,209

5 Claims. (Cl. 144—129)

My invention relates to a type of wood working machine which may be used for cutting moldings, rip and cross cutting, sawing and boring in order to make such articles as the various parts for window screens, panel or glass doors, sash, etc.

One of the objects and features of my invention is a compact and simplified construction of wood working machine, in which a single rotatable mandrel which is mounted in a fixed elevation in a suitable machine frame carries the various interchangeable molding cutters such as may be used to bevel and round edges of wood members, cut grooves, rabbets or the like. Furthermore on this mandrel may be mounted cross cut saws, these being in segments attached to the flat faces preferably of a four sided mandrel. Such four sided mandrel also is used for the various molding tools.

A further feature is mounting a replaceable rip saw on one end of the mandrel and a boring tool on the other end.

In connection with the above type of mandrel with the various tools mounted thereon, another object and feature of my invention is having the upper portion of the table with the table top on which the work is placed, movable as to elevation so that the work may be lifted above the tools on the mandrel when it is desired to perform rip saw work and thus the operator is protected from possible injury by the other tools on the mandrel. In addition the machine is also provided with removable guards of various lengths which may be secured to the table top to protect the work and the operator from the rotating tools on the mandrel which are not required for the immediate work.

Another object and feature of my invention is constructing the upper part of the frame with a front and a back table top, these both being adjustable simultaneously as to elevation relative to the mandrel and also independently. The back table beyond the cutters on the mandrel may be adjusted as to its elevation in relation to the front table; this being to give proper support to finished work after the cut has been removed by the tools on the mandrel, the work being fitted over the front table.

Another object and feature of my invention is at one side of the machine providing a sliding table movable horizontally, which may be used to support work on which boring operations are to take place, such operations being carried out by the boring tool on the end of the mandrel.

A general characteristic of my invention is that it develops a compact woodworking machine suitable for building contractors to use on a particular building job, whereby they can run the stock for and make such articles as window sash, window screens, doors, etc. By having the long mandrel a number of different tools can be secured in place and if any particular tools are not required they can be covered by the cover caps. Also the front and the back table may be elevated and brought towards each other to elevate the tables above cutters not required in operation and to reduce the space between the front and back tables to facilitate passage of short pieces of work from one table to the other.

My invention is illustrated in connection with the accompanying drawings, in which, Fig. 1 is a plan of my invention taken in the direction of the arrow 1 of Figs. 2 or 3.

Fig. 7 is an enlarged transverse section on the line 7—7 of Fig. 6 in the direction of the arrows.

Fig. 8 is a section similar to Fig. 7 on an enlarged scale, the mandrel however being shown in elevation and illustrating the operating procedure.

Fig. 9 is a detail vertical longitudinal section on the line 9—9 of Fig. 8 in the direction of the arrows.

Fig. 10 is a section through a coping tool and the wood operated on.

Figure 3:
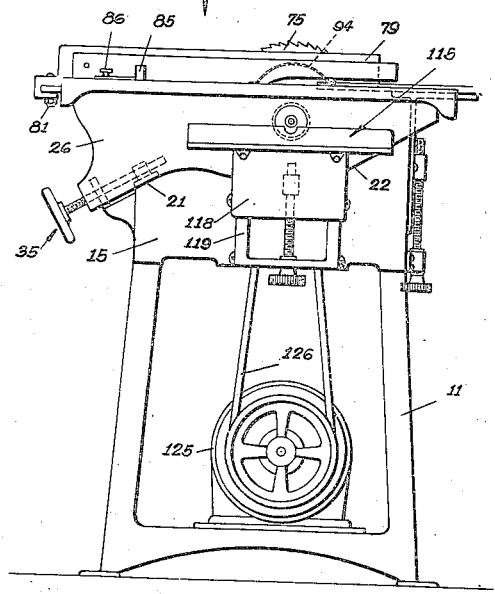
Fig. 3 is a side elevation taken in the direction of the arrow 3 of Fig. 1.

The general frame which I prefer using with my invention has the following structural features comprising a lower supporting frame structure 11, this having legs, a substantial top structure 12 (note Fig. 6) to which is connected a front transverse member 13 preferably by welding, and a rear vertical plate member 14. There are also bottom side irons 15 and 16 (note Figs. 3 and 5). The tops of these side irons form a mounting for the bearings 17 and 18 for the mandrel shaft 19; these bearings being attached to the side irons by arms 20 or the like. (Note particularly Fig. 7.)

The side irons are also provided with sloping rail ends 21 at the front and 22 at the back, for the purpose of elevating the front table designated by the assembly numeral 25. This front table has top side irons 26 and 27 (note Figs. 3 and 5) which are bridged across by a table plate 28 and also by the transverse bearing plate 29 (note Fig. 6). This bearing plate slides on the top edges 21 and a bearing lug 30 slides on the upper edge 22 of the bottom side irons. The top side irons have depending molding 31 engaging the outside of the bottom side irons and maintaining the front table from transverse movement. The upper table irons have a cutout section 32 to accommodate the mandrel shaft and the mandrel hereinunder detailed.

Figure 5:
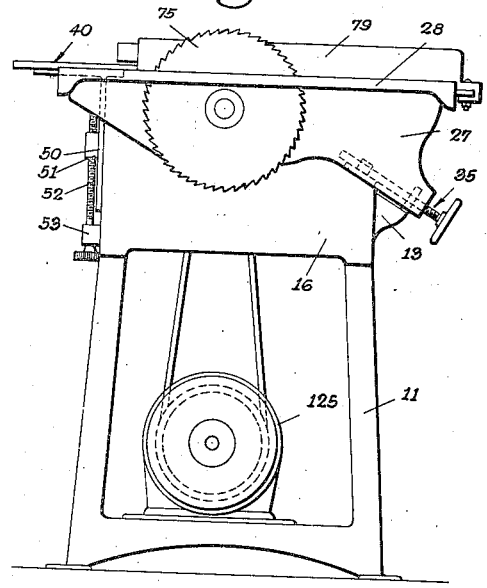
Fig. 5 is a side elevation taken in the direction of the arrow 5 of Fig. 1.
Figure 6:
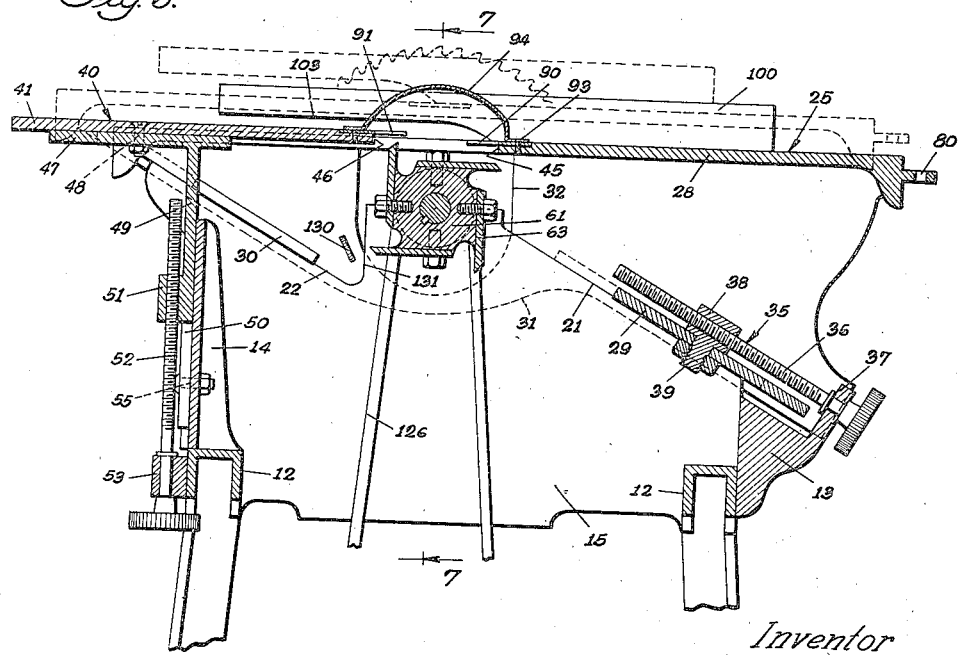
Fig. 6 is an enlarged vertical section on the line 6—6 of Fig. 4 in the direction of the arrows.

The mechanism for sliding the front table to move it slightly rearwardly and to elevate the same is by an adjusting mechanism designated by the assembly numeral 35 (note Fig. 6). This employs a screw 36 operating through a lug 37 on the transverse member 13. The screw threads into a nut 38 which by means of the threaded stud 39 is attached to the transverse bearing plate 29. Thus when the screw is rotated the front table assembly 25 may be moved slightly rearwardly or forwardly and also up or down. In the construction of Fig. 5 the top table is shown in its forward and lowered position.

Figure 1:
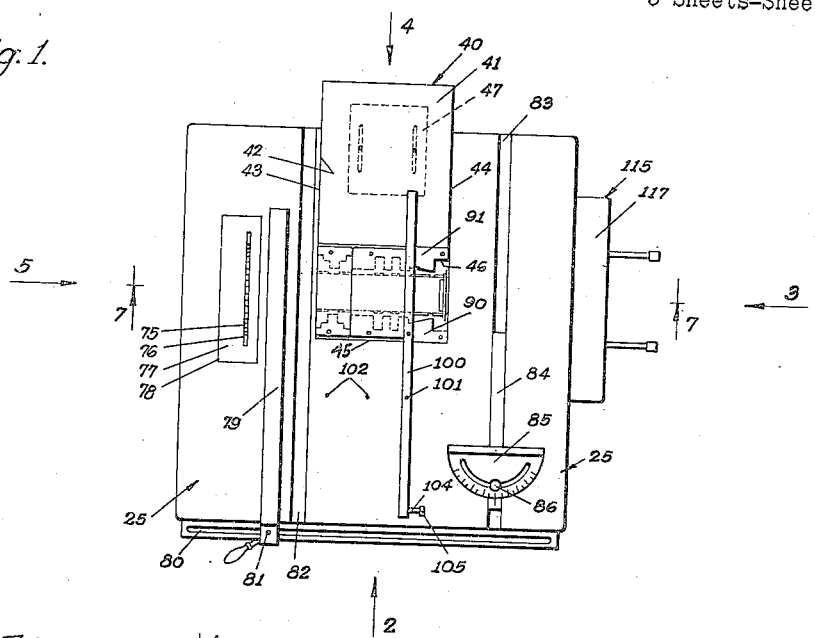
Figure 2:
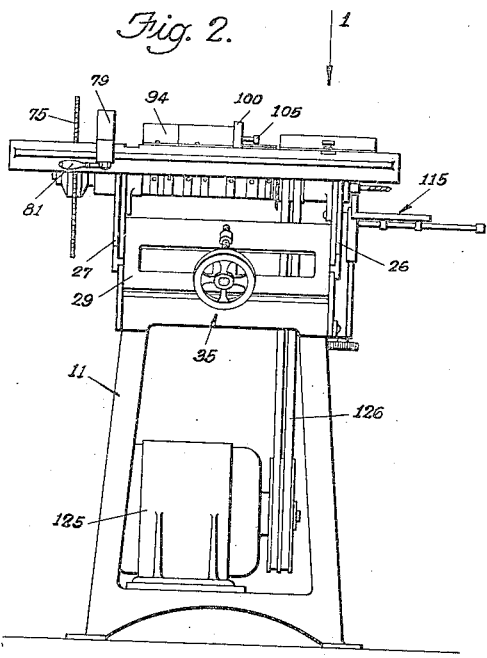
Fig. 2 is a front elevation taken in the direction of the arrow 2 of Fig. 1.
Figure 4:
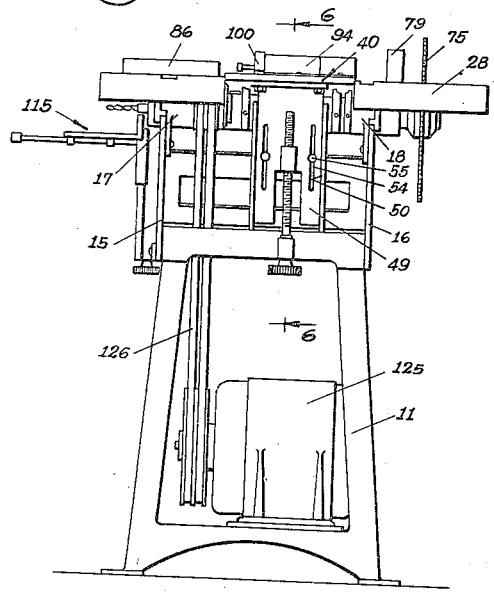
Fig. 4 is a rear elevation taken in the direction of the arrow 4 of Fig. 1.

A back table designated by the assembly numeral 40 (note Figs. 1 and 6) has a substantially rectangular table member 41 and fits in an opening 42 in the table top 28. This opening is defined by the inside edges 43, 44 and the front edge 45. The back table has a front edge 46 (note Fig. 6) and the table member 41 is slidably mounted on the slotted guide plate 47 being secured in position by counter-sunk bolts 48. This guide plate is supported by a vertical slide plate 49, (note Figs. 4 and 6) this operating in guides 50 in the rear vertical plate member 14. The operating mechanism includes a nut 51 formed integral with the plate 49, a screw 52 operating therethrough and having a bearing in a bearing lug 53 secured to or formed integral with the top structure 12. In order to securely clamp the back table in any desired elevated position the plate 49 is provided with vertical slots 54 in which operate clamping bolts 55 extending through the rear vertical plate member 14. It will thus be seen that although the front table may be elevated and moved slightly rearwardly or forwardly, the back table 40 can only be elevated and may be brought into a position with its top surface preferably slightly above the top surface of the table 28, this depending on the extent of cut to be removed from the wood being worked.

The structure of the mandrel and the knives is as follows: The cutting tool assembly is designated generally by the numeral 60 (note particularly Figs. 6 through 9). This employs the mandrel shaft 19 having a square mandrel 61 keyed or otherwise secured thereto. The mandrel is provided with a plurality of bolt holes 62 to which may be attached different cutters 63, these being of a different type in accordance with the work to be performed. In addition cross cut saws 64 may be attached to the mandrel. These are illustrated as having segmental portions 65 and right angular clamping bases 66, these bases being secured to the flat sides of the mandrel and the segments thus rotating in planes transverse to the axis of the mandrel.

Some particular types of tools are shown in Fig. 8 in which one type of cutter 67 forms a rounded corner cut 68 in the wood molding strip 69, this being placed on the front table on its flat side. Another cutter 70 may be used to form a curved cut on another edge of a block. A jointer cutter 71 is for forming a flat cut, the cutter 72 may be used for a corner rabbet and another form of cutter 73 forming a longitudinal groove; the cutter 74 being for giving a bevel edge cut. The cross cut saws may be utilized for producing cuts as shown in Fig. 8 thereby severing strips from the main wood molding or in forming kerfs in the wood.

A removable rip saw 75 is attached to one end of the shaft 19 and operates through an opening 76 preferably in a wood insert 77, this being fitted in a rectangular opening 78 at the table top. In order to form a guide for rip saw work I provide a transversely movable rip saw guide 79 which may be moved crosswise of the machine in a slotted guide 80 and having the usual screw clamp 81 to secure the rip saw guide in position. I also provide a longitudinal channel guide 82 in the surface of the table 28, this being adjacent one side of the back table. I also provide a slot 83; this forming the cross cut saw guide 84 in which is attached the arcuate protractor 85 secured in angular adjustment by the clamp screw 86.

In order to provide protecting guards for the cutter tools, guard plates 90 may be attached to the front table top at the opening for the mandrel and guard plates 91 to the front edge of the rear table top. These have cutout sections providing fingers 92 (note Fig. 9); these plates being replaceable and being shaped in accordance with the tools being used. These guard plates may be attached to the respective tables by bolts 93 or the like. In addition sectional cover guards 94 may be used to bridge the space over the cutters on the mandrel where such cutters are not being used. These are illustrated as being secured to the front table top only, thus allowing relative adjustment of the back table in accordance with the cut made on the wood strips.

In order to center and guide the lengths of wood being operated by the cutters I employ a machine guide 100 which is an elongated bar having a pair of perforations 101 which may be secured by the bolts 93 and by bolts threaded into screw holes 102 on the front table. This guide is cut away at its lower edge 103 (note Fig. 6) to give a clearance above the top of the back table. The forward end of the machine guide has a rail stop 104 which is in the form of a pin having a head 105 adapted to contact the side or edge of a strip of wood as shown in Fig. 8.

The wood boring assembly 115 employs a boring tool 116 secured in the end of the mandrel shaft 19. A work supporting table 117 has a vertical panel 118 (note Fig. 3) operating on a guide 119. The panel may be raised or lowered by a screw 120 operating through a nut portion 121 of the panel and a fixed stud 122 on the lower part of the bottom side iron 15. In addition the table top may be moved upwardly as it is slidably mounted on rods 123 which project laterally from the panel 118. In this manner work may be bored by the same shaft as operates the rip saw, the various cutters and the cross cut saws.

The drive for the mechanism utilizes an electric motor 125 mounted in the base of the stand 11 and having preferably a double V-type belt drive 126 to pulleys 127 on the mandrel shaft 19. In order to form a positive stop for the front table when in its lowermost position, I provide a transverse stop bar 130 (note Fig. 6) connecting the top side irons 26 and 27 of the front table. This is adapted when the top table is in its lowermost position, to engage the upper portions of the bottom side irons 15 and 16 and may contact with the vertical edges 131 which extend upwardly to the journal supports for the mandrel shaft.

From the above description it will be seen that my woodworking machine may be adjusted to many different relative positions of the front table and the back tables, the front table when being raised from its lowermost position moving rearwardly and the back table may be elevated vertically and then the table surface moved either forwardly or rearwardly. Thus the space between the edges 45 of the front table and the front edge 46 of the rear table may be adjusted and in their uppermost positions the cutters could be entirely below these surfaces, allowing for instance, only the projection of the rip saw and cross cut saws if desired. The rip saw guide 79 may be used in guiding work for operation by this saw and when such saw is not required, it may be entirely removed. The guard covers 94 may also be of different sizes so that one or more of these may be used to cover cutters not required for a particular piece of work. Also the plates 90 and 91 having the fingers 92 attached to the front and rear table at the opening provided for the cutters for the mandrel may form effective guards and still allow the cutters to project in the cutting operation between these plates and fingers.

The machine guide 101 as above mentioned may be positioned at different locations longitudinally of the mandrel and of the tools mounted thereon and thus guide work to the various cutters mounted on the mandrel. The cross cut saw guide with the adjusting segment 85 may be readily used where it is desired to make cross cuts in the material being worked.

It will be noted with my invention that satisfactory cross cut saws may be formed of two segments attached to the square mandrel on opposite sides. In addition boring work may be carried out by using the boring tool 116 and the adjustable table 117.

Figure 10:
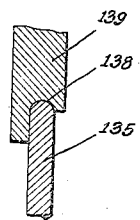
Figure 11:
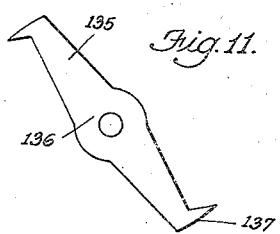
Fig. 11 is a side elevation of a coping tool which may be substituted for the rip saw.

In Fig. 11 I illustrate a coping tool 135 (note Fig. 11). This has a hub section 136 to be secured on the mandrel after removal of the rip saw 75. The tool has cutting ends 137 formed with a curvature to cut a cope indicated at 138 in the wood 139 (note Fig. 10).

Various changes may be made in the details of construction without departing from the spirit or scope of the invention as defined by the appended claims.

I claim:

1. In a wood working tool, a machine frame having upwardly and rearwardly sloping guides, a front table adjustably mounted on said guides for elevation and rearward motion, the front table having a table top with a U-shaped opening therein, a rear table having a rear table top vertically adjustable in the machine frame, the rear table top fitting in said U-shaped opening, the front table top having a rear edge at said opening, and the rear table top having a front edge at said opening, a mandrel shaft journaled in the machine frame and having a mandrel with means for attaching wood working cutters thereto, the cutters being adapted to operate through the opening of said edges, and means to adjust the rear table top horizontally to vary the distance between said edges.

2. In a wood working machine, a fixed frame, a front table top having a U-shaped opening extending forwardly from its back edge, a rear table top fitted in said opening, there being a space between said table tops at the opening, a mandrel shaft having a mandrel with means for attaching wood working cutters to operate through the said opening between the two table tops, means to adjust the front table top upwardly and downwardly in an inclined motion, means to adjust the rear table top vertically and a secondary adjusting means to adjust the rear table top horizontally to thus vary the size of the opening through which the wood working cutters operate.

3. In a wood working machine as claimed in claim 2, the adjacent edges of the front and back plates at the opening each having a guard plate and each guard plate having fingers projecting partly across the space between the front and rear table tops, the said fingers being complementary to the cutters secured to the mandrel, the guard plates and the fingers being adapted to support wood shorter than the span of the space between the table tops.

4. In a wood working machine, a fixed machine frame having lower side irons on opposite sides, bearings therein with a mandrel shaft having a mandrel rotatably mounted in said bearings, upwardly and rearwardly sloping guide rims on the upper edge of each of the lower side irons located forwardly and rearwardly of the said bearings, a front table having a front or main table top, said front table having upper side irons slidably mounted on the sloping guide rims with means interconnected to the fixed frame for raising and lowering the front table with a motion on a slope, the main or front table top having a U-shaped opening extending forwardly from its back edge, a rear table having a rear table top fitted in said opening, means to vertically adjust the rear table as a unit vertically on the fixed frame and means to adjust the rear table top horizontally to provide an opening between the rear edge of the front table top and the front edge of the rear table top at the U-shaped opening.

5. In a device as described, a saw having a plane base and a radially extending web portion formed integral with teeth on the periphery of the web portion forming a segment of a circle, the axial center of such circle being positioned spaced beyond the base and the base being parallel to the said axis and the web portion at right angles to the axis and transverse thereto, the web portion having edges at the opposite ends of the segment having the teeth whereby the plane base may be attached to a flat-sided mandrel with the teeth positioned beyond the circle defined by the rotation of the mandrel.

HENRY J. DIETRICH.